United States Patent [19]
Fujita et al.

[11] Patent Number: 4,794,015
[45] Date of Patent: Dec. 27, 1988

[54] PROCESS FOR EMULSIFYING FAT OR OIL INTO AQUEOUS PHASE COMPRISING SOY SAUCE AS THE MAIN COMPONENT

[75] Inventors: Satoshi Fujita; Hiroshi Edo, both of Tokyo, Japan

[73] Assignee: Asahi Denka Kogyo Kabushiki Kaisha, Osaka, Japan

[21] Appl. No.: 60,223

[22] Filed: Jun. 10, 1987

[51] Int. Cl.$^4$ .................. A23L 1/238; A23L 1/39
[52] U.S. Cl. ...................... 426/589; 426/602; 426/613; 426/661
[58] Field of Search .............. 426/589, 602, 613, 661

[56] References Cited

U.S. PATENT DOCUMENTS

| 3,652,397 | 3/1972 | Pardum | 426/662 |
| 3,661,795 | 5/1972 | Pardum | 426/662 |
| 4,034,124 | 7/1977 | Van Dam | 426/662 |
| 4,115,598 | 9/1978 | Moran | 426/662 |

FOREIGN PATENT DOCUMENTS

| 0023864 | 3/1981 | Japan | 426/589 |
| 0042564 | 4/1981 | Japan | 426/589 |
| 0059154 | 4/1984 | Japan | 426/589 |

Primary Examiner—Jeanette Hunter
Attorney, Agent, or Firm—Frishauf, Holtz, Goodman & Woodward

[57] ABSTRACT

An emulsion of soy sauce and a fat or an oil, which is stable for prolonged period of time, can be obtained by adding 0.1 to 5% by weight, based on the fat or oil, of mono acyl glycero phospholipid(s) as at least one emulsifier component in the emulsification of said fat or oil into an aqueous phase comprising soy sauce as the main component to give an oil-in-water type emulsion.

8 Claims, No Drawings

4,794,015

PROCESS FOR EMULSIFYING FAT OR OIL INTO AQUEOUS PHASE COMPRISING SOY SAUCE AS THE MAIN COMPONENT

BACKGROUND OF THE INVENTION

1. Field of the Invention

This invention relates to a process for emulsifying an edible fat or oil, which would flavor food or improve the properties thereof, into an aqueous phase comprising soy sauce, which has been used as an excellent flavoring agent for a long time, to thereby give a stable oil-in-water type emulsion.

2. Description of the Prior Art

Recently a demand for dressings containing soy sauce as a base together with oil(s) has been increasing year by year. In conventional processes for the production of snack foods including rice crackers such as senbei, arare and okaki, soy sauce and oil(s) are separately applied to these products.

A conventional dressing of the abovementioned type comprises an aqueous phase and an oily phase which are separated from each other and mixed together just before use by shaking. Thus there are no dressings which are usually in the form of a stable oil-in-water type emulsion, except those which contain a large amount of, for example, a thickener and are thus highly viscous.

In the field of snack foods as described above, there is no emulsion which is usually stable and has such a low viscosity that it can be readily applied by, for example, spraying.

Soy sauce generally contains 15 to 17% by weight of common salt and has a low pH value, i.e., around 5, which makes it extremely difficult to emulsify an oil therein.

Although there has been frequently attempted to emulsify an edible oil in soy sauce to thereby give a stable oil-in-water type emulsion, there is no satisfactory product so far. Examples of these attempts include a process for emulsifying an oil in soy sauce to which an aqueous phase containing gelatin and natural gum(s) is added (cf. Japanese Patent Publication No. 2999/1977); and a process wherein emulsifier(s) selected from among diacetyltartaric acid monoglyceride, sucrose fatty acid esters and polyglycerol fatty acid esters are employed optionally together with a stabilizer such as modified starch (or α-starch) or sodium caseinate (cf. Japanese Patent Laid-Open No. 45854/1984).

However every emulsion prepared by these methods is inavailable in practice, because it is relatively stable when allowed to stand at a constant temperature but becomes highly unstable and liable to show the separation or aggregation of oily component(s) when subjected to vibration, stirring, temperature changes or prolonged storage, which would usually occur in actual transportation and distribution.

SUMMARY OF THE INVENTION

It is an object of the present invention to provide a process for emulsifying a fat or an oil into an aqueous phase comprising soy sauce as the main component to thereby give an emulsion which maintains satisfactorily stable emulsification without losing the flowability under such severe conditions as those met in actual distribution and application of a marketed article nd creaming-up emulsified particles thereof, if any, can be readily redispersed by simply stirring or shaking.

It is another object of the present invention to provide a process for obtaining an emulsion of soy sauce and a fat or an oil which contains edible surfactant(s) alone and remains stable for a prolonged period of time without the need of adding any colloidal substances or thickeners thereto.

According to the present invention, these objects can be achieved by emulsifying a fat or an oil into an aqueous phase comprising soy sauce as the main component, to which 0.1 to 5% by weight, based on the oil, of mono acyl glycero phospholipid(s) are added as at lease one emulsifier component.

DETAILED DESCRIPTION OF THE INVENTION

The soy sauce to be used in the present invention is not strictly limited. Thus those obtained by fermenting, for example, soy bean, rice, wheat or fishes in the presence of a large amount of common salt, such as koikuchi soy sauce (dark colored soy sauce), usukuchi soy sauce (light colored soy sauce), tamari soy sauce (viscose soy sauce) or fishery soy sauce such as shottsuru may be employed in general.

The fat or oil to be used in the present invention is not strictly limited so long as it is in the form of a liquid in the emulsification. Examples of the fat or oil include vegetable oils such as soybean oil, corn oil, sesame oil, rapeseed oil, palm oil, coconut oil and cotton seed oil; animal fats such as beef tallow, fish oil, lard and milk fat; and partially hydrogenated products thereof.

The fatty acid of the mono acyl glycero phospholipid(s) (i.e., lyso phosphatide(s)), used as the essential component of the emulsifier in the present invention, are preferably those having eight or more carbon atoms. In each mono acyl glycero phospholipid, the acyl group may be located in either α- or β-position. As the mono acyl glycero phospholipid(s), both of natural ones of L-form and synthetic racemates may be used.

It is known that natural mono acyl glycero phospholipid(s) are present in living organisms together with diacyl glycero phospholipid(s) in, for example, lipids of cereals such as soybean, rapeseed, corn or wheat and of animal cells. Mono acyl glycero phospholipid(s) may be further produced by hydrolyzing diacyl glycero phospholipids present in animal lipids such as yolk or vegetable lipids such as soybean with phospholipase A-2 obtained from swine pancreatic juice or snake venoms or phospholipase A-1 obtained from bacteria; removing the fatty acids thus formed with, for example, acetone; and purifying the residue by, for example, silica gel chromatography, if required (cf. Japanese Patent Laid-Open No. 13263/1971, No. 136966/1977 and No. 51853/1983). In this case, the mono acyl glycero phospholipid(s) thus obtained may be hydrogenated in an appropriate solvent in the presence of a catalyst such as nickel to thereby give a surfactant of a higher oxidation stability.

It is described in J. Amer. Oil Chem. Soc., 886–888, October 1981 that mono acyl glycero phospholipid(s) of various compositions can be obtained by changing the conditions under which the phospholipase A-2 is employed.

Alternately mono acyl glycero phospholipid(s) can be obtained from materials prepared by fractionating diacyl glycero phospholipids with the use of a solvent such as ethyl alcohol. Further methods for preparing phosphatidylcholine such as the one with the use of yolk (cf. J. Biol. Chem., 188, 471–476 (1951)) as well as those as described in Japanese Patent Publication No. 16/1985, No. 42655/1984, No. 123496/1982 and No. 23997/1981 can be applied to the present invention. Every natural mono acyl glycero phospholipid as mentioned above has a levo-rotatory optical activity and is turned out to be safe when orally administered to animals (cf. J. Sci. Food and Agr., 32, 451–458).

The glycero phospholipid(s) to be used in the present invention can be analyzed by, for example, thin layer chromatography, TLC-FID analyser (Iatro Scan method) or high-performance liquid chromatography.

It is preferable that the mono acyl glycero phospholipid(s) (a) to be used in the present invention, which can be obtained by the methods as described above, substantially comprise lyso phosphatidylcholine (i.e. mono acyl phosphatidylcholine). The mono acyl glycero phospholipid(s) (a) may further contain lyso phosphatidylethanolamine and a small amount of one or more mono acyl glycero phospholipid(s) selected from among lyso phosphatidylinositol, lyso phosphatidic acid and lyso phosphatidylserine. The mono acyl glycero phospholipid(s) (a) prepared from natural materials often contain diacyl phosphatide(s) (b) corresponding to the mono acyl glycero phospholipid(s) (a) depending on the employed preparation processes. In such a case, it is preferable that the content of the mono acyl glycero phospholipid(s) (a) is 40% by weight or above, preferably 50% by weight or above, based on the total glycero phospholipids, i.e., (a)+(b).

Mono acyl glycero phospholipid(s) of a relatively high purity may be used together with crude soybean phospholipid(s) containing oily component(s). In this case, it is preferably that the mono acyl glycero phospholipid(s) are dispersed in an aqueous phase while the crude soybean phospholipids are dispersed in an oily phase.

As described above, the emulsifier(s) to be used in the present invention comprise mono acyl glycero phospholipid(s) as an essential component. Preferable examples of emulsifiers to be used therewith include polyglycerol fatty acid esters, sucrose fatty acid esters, sorbitol fatty acid esters and glycerol fatty acid monoesters. With the use of these esters, the objects of the present invention can be achieved at a relatively low cost.

Examples of the polyglycerol fatty acid esters to be preferably used in the present invention together with the mono acyl glycero phospholipid(s) are mono-, di- or polyesters of polyglycerols having a degree of polymerization of 4 to 10 with saturated and/or unsaturated fatty acids having 14 to 22 carbon atoms and mixtures thereof. Polyglycerol fatty acid esters having 13 or less carbon atoms would exhibit a bitter taste, while those having 23 or more carbon atoms are hardly available in general.

Examples of the sucrose fatty acid esters to be preferably used in the present invention together with the mono acyl glycero phospholipid(s) or mono-, di- or polyesters of sucrose with saturated and/or unsaturated fatty acids having 12 to 22 carbon atoms and mixtures thereof. Sucrose fatty acid esters having 11 or less carbon atoms would exhibit only limited emulsifying effects, while those having 23 or more carbon atoms are hardly available in general.

Examples of the sorbitol fatty acid esters to be preferably used in the present invention together with the mono acyl glycero phospholipid(s) are mono-, di- or polyesters or sorbitol, sorbitan or sorbide with saturated and/or unsaturated fatty acids having 12 to 22 carbon atoms and mixtures thereof. Sorbitol fatty acid esters having 11 or less carbon atoms would exhibit only limited emulsifying effects, while those having 23 or more carbon atoms are hardly available in general.

Examples of the glycerol fatty acid monoesters to be preferably used in the present invention together with the mono acyl glycero phospholipid(s) are monoesters of glycerol with saturated and/or unsaturated fatty acids having 12 to 22 carbon atoms and mixtures mainly comprising the monoesters together with a small amount of di- and/or triesters. Glycerol fatty acid monoesters having 11 or less carbon atoms would exhibit only limited emulsifying effects, while those having 23 or more carbon atoms are hardly available in general.

It is preferable that the emulsifier composition to be used in the present invention comprises the mono acyl glycero phospholipid(s) and polyglycerol fatty acid ester(s), sucrose fatty acid ester(s) or sorbitol fatty acid ester(s) in a weight ratio of 30:70 to 100:0; or the mono acyl glycero phospholipid(s) and glycerol fatty acid monoester(s) at a weight ratio of 50:50 to 100:0. When the amount of the mono acyl glycero phospholipid(s) is smaller, the effects of the present invention are not enough.

The mono acyl glycero phospholipid(s) are used in an amount of 0.1 to 5% by weight based on the fat or oil. When they are less than 0.1% by weight, the effects of the present invention can not be achieved. The content of the same within a range of approximately 0.1 to 0.5% is suitable when emulsified particles are relatively large and a relatively large amount of thickener(s) and/or emusification stabilizer(s) are employed. On the other hand, the content of the same within a range of 0.5 to 5% by weight is suitable where emulsified particles are relatively fine. When an emulsion contains a small amount of oily component(s), it is preferable that the mono acyl glycero phospholipid(s) are added in a relatively large amount based on the fat or oil. The addition of the same in an amount exceeding 5% by weight is disadvantageous from the economical viewpoint since it brings about no change in the effects and sometimes alters the taste.

Gernerally speaking, the required amount of the mono acyl glycero phospholipid(s) would decrease with an increase in the purity of the same.

When the above emulsifier(s) are to be used together with the mono acyl glycero phospholipid(s), the total amount of the emulsifier mixture is 0.1 to 5% by weight based on the fat or oil. The addition of the same in an amount exceeding 5% by weight is disadvantageous from the economical viewpoint since it brings about no change in the effects and sometimes alters the taste.

In the process of the present invention, other surfactants may be further added as emulsifiers without departing from the scope thereof.

It is further preferable that soluble proteins such as gelatin, peptides such as water-soluble polypeptides, polysaccharides such as modified starch and gums such as gum arabic or tragacanth gum are added together with the abovementioned emulsifiers, since these materials would retard the creaming up of emulsified particles to thereby suppress the aggregation thereof.

In the process of the present invention, various food additives such as spices, perfumes, seasonings, mono sodium glutamate, sugars, vitamins, essential oils and preservatives may be added in the emulsification of the above aqueous phase and the oily phase, without departing from the scope of the invention.

The emulsifying process of the present invention may be summarized as follows.

Namely, mono acyl glycero phospholipid(s) optionally with the surfactant(s) as described above are dispersed or dissolved in an aqueous phase comprising soy sauce as the main component or a fat or an oil. It is preferable that hydrophilic and hydrophobic surfactants are dispersed or dissolved in the aqueous phase and fat or oil, respectively. Other additives such as proteins are further added thereto if required. The resulting mixture is heated and stirred, if required, to thereby preliminarily emulsify the same. Subsequently, the obtained product is further emulsified by stirring at a high speed, using a pressure homogenizer, a colloid mill or an ultrasonic device or combining some of these techniques to thereby give the aimed emulsion. It is possible to pasteruize the product before or after the emulsification with the use of a pasteurizer or a plate heat exchanger, if required.

To further illustrate the present invention, and not by way of limitation, the following Examples will be given.

The term "glycero phospholipid" as used hereinbelow refers to a glycero phospholipid containing mono acyl glycero phospholipid and diacyl glycero phospholipid as main components.

EXAMPLE 1

Glycero phospholipids containing 70% of phosphatidylcholine were obtained from commercially available soybean phospholipids through precipitation with acetone and fractionation with aqueous ethanol. The glycero phospholipids were reacted with phospholipase A-2 obtained from swine pancreatic juice (Lecithase 10 L, a product of Novo). The fatty acids thus formed were removed with acetone and the residue was fractionated with an alcohol. After further fractionating with the use of a silicic acid column and an alcohol, glycero phospholipids containing 95% of lyso phosphatidylcholine and 2% of lyso phosphatidylethanolamine, i.e., 97% of mono acyl glycero phospholipids in total, were obtained.

0.5 g of the obtained glycero phospholipids were dissolved in 5 ml of water and 51 g of koikuchi soy sauce and 50 g of corn salad oil were added thereto. The mixture thus obtained was emulsified in a homogenizer (AM-8 mfd. by Nippon Seiki Co., Ltd.) at 55° C. and 13,000 rpm for six minutes. The emulsion thus formed was introduced into a glass cylinder and stored in a thermostat while periodically changing the temperature, i.e., 20° C. for 12 hours and 35° C. for 12 hours to thereby observe the stability thereof.

As a result, no oily phase separated out after 90 days and the creamy phase amounting to 80% of the whole was homogeneous while the bottom aqueous phase amounting to 20% thereof was highly flowable. These phases were readily redispersed by shaking and scarcely any separation of the aqueous phase was observed one day after the redispersion.

EXAMPLE 2

0.5 g of the glycero phospholipids as described in Example 1 were dissolved in 5 ml of water and 70 g of koikuchi soy sauce containing 15% by weight of common salt. 25 g of refined sesame oil and 0, 0.25, 0.5 or 0.75 g of commercially available soybean phospholipids containing 61% of an acetone-insoluble fraction were added thereto. Each mixture thus obtained was emulsified in the same manner as the one described in Example 1.

After allowing to stand at room temperature for two months, 0.3% of an oily phase separated out in the case of the mixture containing no soybean phospholipids, and 0.2% of an oily phase separated out in the case of the mixture containing 0.75 g of commercially available soybean phospholipids, while no separation was observed in other cases.

After six months, 2% of an oily phase separated out and the creamy phase amounted to 29% in the case of the mixture containing no soybean phospholipids.

In the case of the mixture containing 0.25 g of the commercially available soybean phospholipids, a trace oily phase was observed and the creamy phase amounted to 33%.

In the case of the one containing 0.5 g of the commercially available soybean phospholipids, no oily phase separated out and the creamy phase amounted to 33%.

In the case of the one containing 0.75 g of the commercially available soybean phospholipids, 0.5% of an oily phase separated out and the creamy phase amounted to 33%.

Each mixture was highly flowable and the creamy phase thereof could be readily redispersed by shaking to thereby give a homogeneous emulsion.

EXAMPLE 3

Defatted phospholipids, which were obtained from soybean phospholipids through precipitation with acetone, were reacted with Lecithase 10 L. Then glycero phospholipids were extracted from the reaction mixture with a mixture of isopropyl alcohol and hexane and treated with acetone to thereby defat the same. After extracting the defatted product with an alcohol, glycero phospholipids containing a large amount of mono acyl glycero phospholipids were obtained. The obtained glycero phospholipids contained mainly 48% of lyso phosphatidylcholine and 11% of lyso phosphatidylethanolamine and 62% of mono acyl glycero phospholipids in total.

0.5 g of the glycero phospholipids were dissolved in 5 ml of water and 51 g of koikuchi soy sauce containing 15% by weight of common salt and 50 g of corn salad oil, i.e., the amount of the mono acyl glycero phospholipids corresponding to 0.62% of the oil, were added thereto. The obtained mixture was emulsified and tested in the same manner as the one described in Example 1.

After 90 days, scarcely any oily phase separated out and the creamy phase, which amounted to 74% of the whole, could be readily redispersed by shaking. One day after the redispersion, the creamy phase amounted to 97%, showing excellent emulsification.

EXAMPLE 4

Defatted phospholipids, which were obtained from soybean phospholipids through precipitation with acetone, were reacted with Lecithase 10 L. Then the reaction mixture was defatted by adding acetone thereto again. The aqueous acetone phase as used herein was solidified by drying and subjected to precipitation with the use of acetone again. The mono acyl glycero phospholipid(s) thus eluted were collected and combined with the defatted product obtained above. After fractionating with ethanol, glycero phospholipids containing a large amount of mono acyl glycero phospholipids, which mainly comprised 56% of lyso phosphatidylcholine and 13% of lyso phosphatidylethanolamine and contained 71% of mono acyl glycero phospholipids in total, were obtained.

1 g of the glycero phospholipids thus obtained, i.e., the amount of the mono acyl glycero phospholipids contained therein corresponding to 1.4% of the oil, were emulsified and tested in the same manner as in Example 1.

After 90 days, scarcely any oily phase separated out and the creamy phase, which amounted to 79% of the whole, was highly flowable and could be readily redispersed by shaking. One day after the redispersion, scarcely any aqueous bottom phase separated out.

EXAMPLE 4

80 g of the glycero phospholipids as described in Ecample 4, i.e., the amount of the mono acyl glycero phospholipids contained therein corresponding to 1% of the oil, were dissolved in 160 ml of water to give a paste. 4 kg of koikuchi soy sauce, 5.6 kg of refined sesame oil, 80 g of modified α-starch (Instant Clear Gel, a product Oji International Co., Ltd.) and 80 g of partially decomposed polypeptide (UA 2, a product of Nitta Gelatin Co., Ltd.) were added to the above paste and the resulting mixture was stirred with relatively high speed in a small pausterizer at 60° C. for 30 minutes to thereby effect preliminary emulsificaiton as well as pasteurization. Then it was homogenized in a high-pressure homogenizer (3205-200 LH mfd. by Sanwa Kikai Co., Ltd.) at 45° C. under pressures of 350 kg/cm$^2$ and 50 kg/cm$^2$ in the first and second valve stages respectively.

The obtained product was subjected to the same test as the one described in Example 1. Separately it was stored at room temperature and 40° C. and in a refrigerator.

As a result, scarcely any aqueous bottom phase separated out in each sample which remained highly flowable, after three months.

EXAMPLE 6

Lecithase 10 L was reacted with Lecinol 10 E (a product of Nippon Surfactant Co., Ltd.; a glycero phospholipid product containing 81% of hydrogenated phosphatidylcholine and 9% of phosphatidylethanolamine and having an iodine value of 7). From the reaction mixture, fatty acids were removed by adding acetone thereto and the residue was fractionated with ethanol to give glycero phospholipids containing lyso phospholipids, which mainly comprised 41% of lyso phosphatidylcholine and 3% of lyso glycero phosphatidylethanolamine and contained 45% of mono acyl glycero phospholipids in total.

5 g of the glycero phospholipids, i.e., the amount of mono acyl glycero phospholipids contained therein corresponding to 1.3% of the oil, were dissolved in 50 ml of water and 500 g of refined corn oil, 22 g of polypeptide obtained by partially decomposing gelatin and 500 g of koikuchi soy sauce were mixed therewith. The resulting mixture was pasteurized by stirring at 60° C. for 30 minutes and subjected to preliminary emulsification in a homomixer (TK Homomixer HV-M mfd. by Tokushu Kika Kogyo Co., Ltd.). Then it was homogenized twice in a small homogenizer (15M-8BA mfd. by Manton-Gaulin) at 40° under pressures of 300 kg/cm$^2$ and 50 kg/cm$^2$ in the first and second steps, respectively.

Then the obtained product was tested in the same manner as the one described in Example 1. As a result, scarcely any oily phase separated out and the creamy phase amounted to 71% after two months.

EXAMPLE 7 TO 32 AND COMPARATIVE EXAMPLES 1 TO 11

The procedure of Example 1 was followed except that emulsifiers as shown in Table 1 were added to the glycero phospholipids as used in Examples 1, 3, 4 and 6 in a ratios as shown in Table 1, wherein the glycero phospholipids and emulsifiers having an HLB of 8 or above were dissolved or formulated into a paste in 5 ml of water, while those having an HLB of 7 or below were dissolved or dispersed in a fat or an oil.

In Comparative Examples, these emulsifiers were used alone.

Table 1 shows the results, wherein the amount (%) of a separated oily phase includes large oil droplets present in a creamy phase.

TABLE 1

| Ex. No. or Comp. Ex. No. | Glycero phospholipid (Ex. No.) | Emulsifier used together | Weight ratio of glycero phospholipid to emulsifier | % by weight of glycero phospholipid and emulsifier based on oil | Time required for separation of 2% of oily phase (days) |
|---|---|---|---|---|---|
| Ex. 7  | Ex. 1 | Sun Soft Q-17-U  | 7:3 | 1 | >90 |
| Ex. 8  | Ex. 1 | Sun Soft Q-17-U  | 5:5 | 1 | " |
| Ex. 9  | Ex. 3 | Sun Soft Q-17-U  | 5:5 | 1 | " |
| Ex. 10 | Ex. 4 | SY Glyster SS500 | 7:3 | 1 | " |
| Ex. 11 | Ex. 4 | SY Glyster SS500 | 5:5 | 1 | " |
| Ex. 12 | Ex. 4 | SY Glyster SS500 | 3:7 | 1 | " |
| Ex. 13 | Ex. 4 | SY Glyster TS500 | 5:5 | 1 | " |
| Ex. 14 | Ex. 4 | SY Glyster TS500 | 3:7 | 1 | " |
| Ex. 15 | Ex. 3 | SY Glyster MS310 | 5:5 | 1 | " |
| Ex. 16 | Ex. 3 | SY Glyster MS310 | 7:3 | 1 | " |
| Ex. 17 | Ex. 1 | SE-S770          | 7:3 | 1 | " |
| Ex. 18 | Ex. 1 | SE-S770          | 5:5 | 1 | " |
| Ex. 19 | Ex. 1 | SE-S770          | 3:7 | 1 | " |
| Ex. 20 | Ex. 3 | SE-S1670         | 5:5 | 1 | " |
| Ex. 21 | Ex. 4 | Emusol S-10F     | 7:3 | 2 | " |
| Ex. 22 | Ex. 4 | Emusol S-10F     | 5:5 | 2 | " |
| Ex. 23 | Ex. 4 | Emulsy MS        | 7:3 | 2 | " |
| Ex. 24 | Ex. 4 | Emulsy MS        | 5:5 | 2 | " |
| Ex. 25 | Ex. 1 | SE-S1170         | 5:5 | 1 | " |
| Ex. 26 | Ex. 3 | SE-S770          | 5:5 | 1 | " |
| Ex. 27 | Ex. 6 | SY Glyster GS500 | 5:5 | 2 | " |
| Ex. 28 | Ex. 1 | SY Glyster TS500 | 5:5 | 2 | >90 |

TABLE 1-continued

| Ex. No. | | | | | |
|---|---|---|---|---|---|
| Ex. 29 | Ex. 4 | Emulsy MO | 7:3 | 2 | " |
| Ex. 30 | Ex. 4 | Emulsy MO | 5:5 | 2 | 90 |
| Ex. 31 | Ex. 1 | SE-S770 and Emulsy MS | 6:2:2 | 1.5 | >90 |
| Ex. 32 | Ex. 4 | SY Glyster MS310 and Emulsy MS | 5:3:2 | 2 | " |
| Comp. Ex. 1 | none | Sun Soft Q-17-U | | 1 | 3 |
| Comp. Ex. 2 | " | SY Glyster SS500 | | 1 | 21 |
| Comp. Ex. 3 | " | SY Glyster TS500 | | 1 | 2 |
| Comp. Ex. 4 | " | SY Glyster MS310 | | 1 | 7 |
| Comp. Ex. 5 | " | SE-S770 | | 1 | 4 |
| Comp. Ex. 6 | " | SE-S1670 | | 1 | 5 |
| Comp. Ex. 7 | " | SE-S1170 | | 1 | 2 |
| Comp. Ex. 8 | " | Emulsol S10F | | 1 | emulsification impossible |
| Comp. Ex. 9 | " | Emulsy MS | | 2 | emulsification impossible |
| Comp. Ex. 10 | " | Emulsy MO | | 2 | emulsification impossible |
| Comp. Ex. 11 | " | Sun Soft Q-17-U | | 2 | 10 |

| Ex. No. or Comp. Ex. No. | Oily phase separated after 3 months | Creamy phase after 3 months (%) | Redispersion by shaking | Note |
|---|---|---|---|---|
| Ex. 7 | scarcely any | 68 | very easy | |
| Ex. 8 | 1 | 64 | easy | |
| Ex. 9 | 1.5 | 63 | " | |
| Ex. 10 | scarcely any | 76 | very easy | |
| Ex. 11 | " | 72 | " | |
| Ex. 12 | " | 67 | easy | |
| Ex. 13 | " | 70 | " | |
| Ex. 14 | " | 64 | possible | |
| Ex. 15 | " | 67 | easy | |
| Ex. 16 | 1 | 73 | possible | |
| Ex. 17 | none | 79 | very easy | |
| Ex. 18 | scarcely any | 78 | very easy | |
| Ex. 19 | " | 70 | possible | |
| Ex. 20 | " | 72 | easy | |
| Ex. 21 | " | 71 | " | |
| Ex. 22 | " | 66 | " | |
| Ex. 23 | " | 72 | " | |
| Ex. 24 | 1.5 | 69 | possible | |
| Ex. 25 | scarcely any | 72 | easy | |
| Ex. 26 | " | 67 | " | |
| Ex. 27 | 1.5 | 66 | possible | |
| Ex. 28 | scarcely any | 80 | easy | |
| Ex. 29 | " | 73 | " | |
| Ex. 30 | 2 | 65 | possible | |
| Ex. 31 | none | 82 | very easy | |
| Ex. 32 | " | 81 | " | |
| Comp. Ex. 1 | 25 | | impossible | creamy phase comprised large oil droplets |
| Comp. Ex. 2 | 4 | 70 | difficult | heterogenous creamy phase |
| Comp. Ex. 3 | emulsion broken | emulsion broken | impossible | emulsion broken within 7 days |
| Comp. Ex. 4 | 21 | | " | creamy phase comprised large oil droplets |
| Comp. Ex. 5 | emulsion broken | emulsion broken | " | emulsion broken within 25 days |
| Comp. Ex. 6 | " | " | " | emulsion broken within 35 days |
| Comp. Ex. 7 | " | " | " | emulsion broken within 7 days |
| Comp. Ex. 3 | emulsification impossible | emulsification impossible | " | Oily phase separated out after 3 hours |
| Comp. Ex. 9 | emulsification impossible | emulsification impossible | " | Oily phase separated out immediately |
| Comp. Ex. 10 | emulsification impossible | emulsification impossible | " | Oily phase separated out immediately |
| Comp. | 23 | | " | creamy phase comprised |

TABLE 1-continued

| Ex. 11 | large oil droplets |
|---|---|

Sun Soft Q-17-U: Taiyo Kagaku Co., Ltd., polyglycerol (10) monooleate HLB 15 (by emulsification method)
SY Greaster SS500: Sakamoto Yakuhin Co., Ltd., polyglycerol (6) sesquistearate, HLB 10
SY Greaster TS500: Sakamoto Yakuhin Co., Ltd., polyglycerol (6) tristearate, HLB 7
SY Greaster MS310: Sakamoto Yakuhin Co., Ltd., polyglycerol (6) monostearate, HLB 8
SE-S770: Mitsubishi Kasei Shokuhin Co., Ltd., sucrose distearate, HLB 7
SE-S1170: Mitsubishi Kasei Shokuhin Co., Ltd., sucrose mono-, di-stearate, HLB 11
SE-S1670: Mitsubishi Kasei Shokuhin Co., Ltd., sucrose monostearate, HLB 15
Emulsol S-10-F: Kao Corporation, sorbitol monostearate, HLB 4.7
Emulsy MS: Riken Vitamin Co., Ltd., glycerol monostearate, HLB 2.5
Emulsy MO: Riken Vitamin Co., Ltd., glycerol monooleate, HLB 2.5

EXAMPLE 33

The procedure of Examle 4 was followed except that partially hydrogenated soybean oil having an elevated melting point of 34° C. was employed. The emulsion thus obtained was subjected to the same test as the one described in Example 4. As a result, scarcely any oily phase separated out and the product maintained an excellent condition after 90 days.

EXAMPLE 34

A solution of 0.5 g of the glycero phospholipids as used in Example 1 dissolved in 5 ml of water was mixed with 51.9 g of koikuchi soy sauce containing 15% by weight of common salt, 35 g of sesame oil, 5 g of vinegar containing 15% of acetic acid, 0.1 g of a mono sodium glutamate and 3 g of refined sugar. The resulting mixture was emulsified in a homogenizer (AM-8 mfd. by Nippon Seiki Co., Ltd.) at room temperature and 15,000 rpm for six minutes to give a dressing. This dressing was subjected to the same test as the one described in Example 1. As a result, scarcely any oily phase separated out after 90 days.

EXAMPLE 35

A solution of 0.5 g of the glycero phospholipids, as used in Example 3, i.e., the amount of the mono acyl glycero phospholipids contained therein corresponding to 0.78% of the oil, dissolved in 5 ml of water was mixed with 46.9 g of koikuchi soy sauce containing 15% by weight of common salt, 5 g of vinegar containing 15% of acetic acid, 0.1 g of a mono sodium glutamate and 3 g of thick malt syrup under stirring to give an aqueous phase. Then 40 g of corn salad oil was added thereto under stirring in vacuo and the resulting mixture was preliminarily emulsified with a TK homomixer and then treated in a colloid mill (Mill Mix mfd. by Nippon Seiki Co., Ltd.) to give a dressing. The dressing thus obtained was subjected to the same test as the one described in Example 1. As a result, scarcely any oily phase separated out and the cramy phase, which amounted to 70% of the whole, was highly flowable and could be readily redispersed by shaking after 90 days. The creamy phase amounted to 98% one day after the redispersion, showing excellent emulsification.

EXAMPLE 36

A solution of 1 g of the glycero phospholipid as used in Example 4, i.e., the amount of the mono acyl glycero phospholipids contained therein corresponding to 1.8% of the oil, was mixed with 46.8 g of koikuchi soy sauce containing 15% by weight of common salt, 5 g of vinegar containing 15% of acetic acid, 0.1 g of mono sodium glutamate, 3 g of thick malt syrup and 0.1 g of xanthan gum (Keltrol manufactured by Merck & Co.) to give an aqueous phase. Then 40 g of corn salad oil was added thereto under stirring in vacuo. The resulting mixture was preliminarily emulsified in a TK homomixer and then treated with a colloid mill (Mill Mix mfd. by Nippon Seiki Co., Ltd.) in a conventional manner to give a dressing. The dressing thus obtained was subjected to the same test as the one described in Example 1. As a result, scarcely any oily phase separated out and the product remained in an excellent creamy state after 90 days.

What is claimed is:

1. A process for emulsifying a fat or an oil into an aqueous phase comprising at least 50% soy sauce and therefor a high salt content, which comprises
    adding 0.5 to 5% by weight, based on said fat or oil, of glycero phospholipid(s) containing at least 40% by weight of mono acyl glycero phospholipid(s) as at least one emulsifier component in the emulsification of said fat or oil, into said aqueous phase, said aqueous phase comprising at least 50% by weight soy sauce; thereafter
    adding said fat or oil to said aqueous phase and emulsifying the mixture.

2. The process of claim 1 wherein said mono acyl glycero phospholipid(s) comprises at least 50% lyso phosphatidylcholine.

3. The process of claim 1, wherein said emulsifier component is composed of mono acyl glycero phospholipid(s) and one or more emulsifiers selected from among polyglycerol fatty acid esters, sucrose fatty acid esters and sorbitol fatty acid esters in a weight ratio of 30:70 to 100:0.

4. The process of claim 1 wherein said glycero phospholipids are mono acyl glycero phospholipids and said mono acyl glycero phospholipids comprise at least 50% lyso phosphatidylcholine.

5. The process of claim 1 wherein said emulsifier component comprises a further component emulsifier selected from the group consisting of polyglycerol fatty acid esters, sucrose fatty acid esters and sorbitol fatty acid esters in a weight ratio of mono acyl glycero phospholipid: said further component emulsifiers=30:70 to 100:0.

6. The process of claim 1, which uses glycerol fatty acid monoester(s) in a weight ratio of mono acyl glycero phospholipid(s) in glycero phospholipid(s):-glycero phospholipid(s) of 50:50 to 100:0 as the emulsifier.

7. The process of claim 6 which comprises adding more than HLB8 of emulsifiers to an aqueous phase and/or adding less than HLB7 of other emulsifiers to a fat or an oil, in the case of using emulsifiers besides glycero phospholipid(s).

8. The process of claim 5, which comprises adding more than HLB8 of emulsifiers to an aqueous phase and/or adding less than HLB7 of other emulsifiers to a fat or an oil, in the case of using emulsifiers besides glycero phospholipid(s).

* * * * *

UNITED STATES PATENT AND TRADEMARK OFFICE
CERTIFICATE OF CORRECTION

PATENT NO. : 4,794,015
DATED : December 27, 1988
INVENTOR(S) : FUJITA et al

It is certified that error appears in the above-identified patent and that said Letters Patent is hereby corrected as shown below:

```
Title Page:  Add the following
  --[30]         Foreign Application Priority Data
     June 18, 1986 [JP]  Japan .......... 61-141626 --.

Column 1, line 66:  Replace "nd" with --and--.
```

Signed and Sealed this

Twentieth Day of February, 1990

*Attest:*

JEFFREY M. SAMUELS

*Attesting Officer*   *Acting Commissioner of Patents and Trademarks*

UNITED STATES PATENT AND TRADEMARK OFFICE
CERTIFICATE OF CORRECTION

PATENT NO. : 4,794,015

DATED : December 27, 1988

INVENTOR(S) : FUJITA et al

It is certified that error appears in the above-identified patent and that said Letters Patent is hereby corrected as shown below:

Title Page: [73] Assignee: After "Asahi Denka Kogyo Kabushiki Kaisha, Osaka, Japan" add --Nippon Shoji Kaisha, Ltd., Osaka, Japan--.

Signed and Sealed this

Eleventh Day of August, 1992

Attest:

DOUGLAS B. COMER

*Attesting Officer*  *Acting Commissioner of Patents and Trademarks*